United States Patent [19]

Gellert

[11] Patent Number: 4,865,535
[45] Date of Patent: Sep. 12, 1989

[54] INJECTION MOLDING NOZZLE HAVING MULTIPLE THICKNESS HEATING ELEMENT

[76] Inventor: Jobst U. Gellert, 7A Prince Street, Georgetown, Ontario, Canada, L7G 2X1

[21] Appl. No.: 187,310

[22] Filed: Apr. 28, 1988

[30] Foreign Application Priority Data

Apr. 13, 1988 [CA] Canada .................................. 563981

[51] Int. Cl.⁴ .............................................. B29C 45/20
[52] U.S. Cl. .............................. 425/549; 264/328.15; 425/568; 425/570
[58] Field of Search ............... 425/549, 568, 569, 570, 425/572, 588; 264/328.8, 328.15

[56] References Cited

U.S. PATENT DOCUMENTS 4,516,927  5/1985  Yoshida ............................... 425/549
4,688,622  8/1987  Gellert .................................... 164/61

Primary Examiner—Jay H. Woo
Assistant Examiner—Timothy W. Heitbrink
Attorney, Agent, or Firm—Riches, McKenzie & Herbert

[57] ABSTRACT

This invention relates to an injection molding nozzle having an improved heating element configuration in the tapered nose portion and a method of making it. A longitudinal portion of the heating element which is integrally brazed centrally into the nose portion is bent back upon itself at least once to provide a multiple thickness part. The type and length of the multiple thickness part which is selected to provide additional heat depends upon the application which the nozzle is to be used for. The multiple thickness part of the heating element is swaged to provide a more circular cross-section before being brazed into a larger diameter part of the heating element bore through the nose portion of the nozzle.

5 Claims, 6 Drawing Sheets

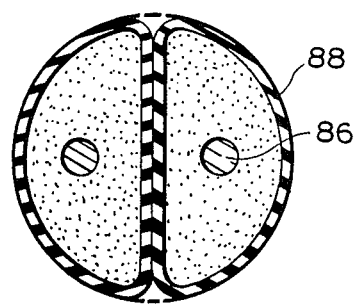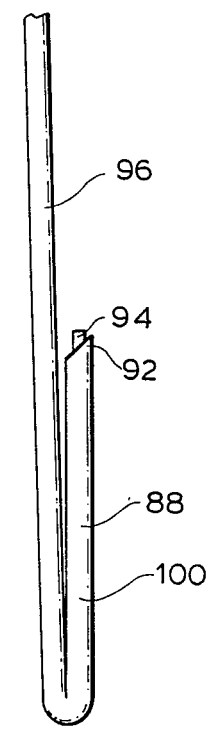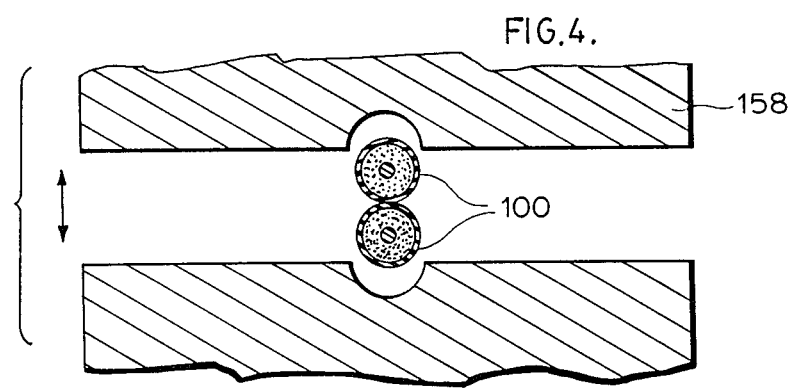

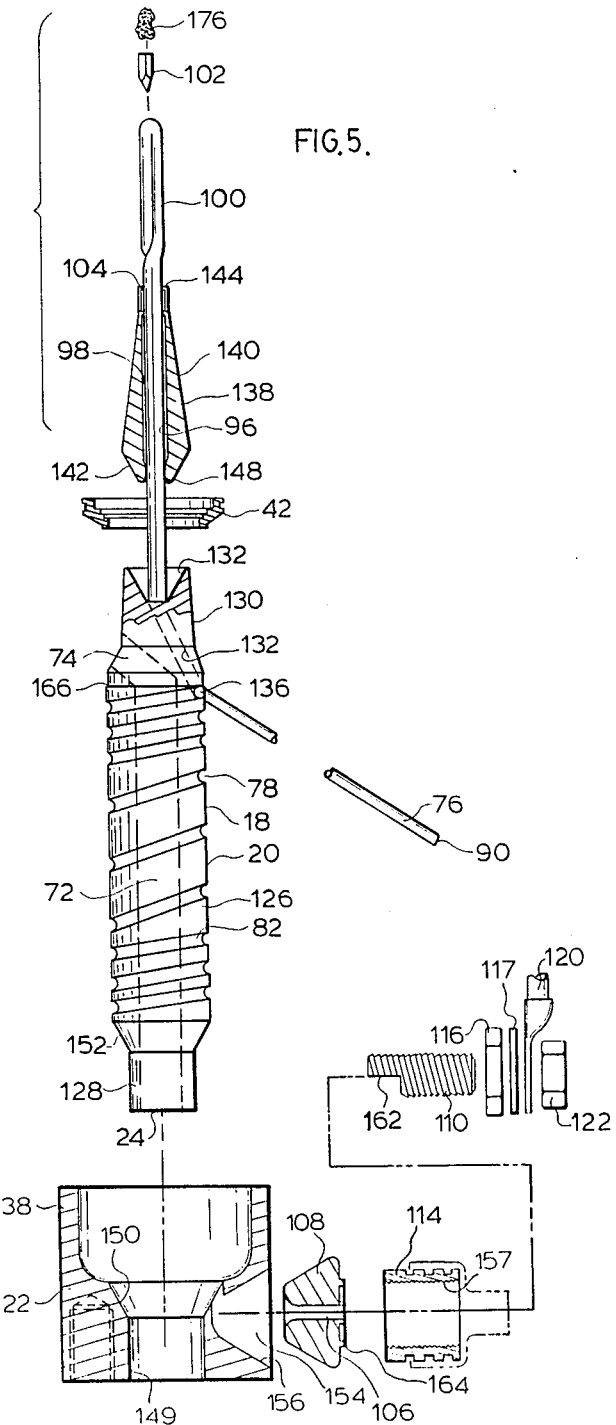

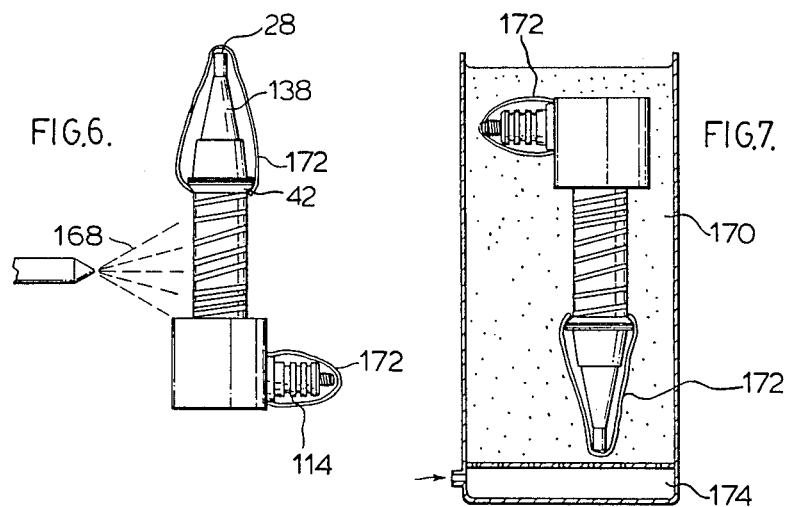

INJECTION MOLDING NOZZLE HAVING MULTIPLE THICKNESS HEATING ELEMENT

BACKGROUND OF THE INVENTION

This invention relates generally to injection molding and more particularly to an injection molding nozzle having an improved heating element configuration in the tapered nose portion and a method of making it.

Injection molding nozzles having an electrical heating element extending into a tapered nose portion are known in the art. The applicant's Canadian patent application Ser. No. 542,185 entitled "Coated Injection Molding Nozzle and Method" filed July 15, 1987 shows a nozzle in which the forward end of the heating element extends into a diagonal bore in the nose portion. More recently, the applicant's Canadian patent application serial number 549,517 entitled "Method of Manufacture of Injection Molding Nozzle Having Grounded Heating Element Brazed into Pointed Tip" and Canadian patent application serial No. 549,518 to Mold-Masters Limited entitled "Injection Molding Nozzle Having Grounded Heating Element Brazed into Pointed Tip" filed Oct. 16, 1987 disclose grounding the forward end of the heating element an air-hard tool steel insert which forms a pointed tip at the forward end of the nozzle. While these arrangements are indeed advantageous, they have the disadvantage for some applications that the portion of the heating element extending through the nose portion of the nozzle provides a substantially uniform amount of heat along its length.

SUMMARY OF THE INVENTION

Accordingly, it is an object of the present invention to at least partially overcome these disadvantages by providing a nozzle with a heating element extending into the nose portion whereby additional heat can be provided along a selected portion of the length of the nose portion.

To this end, in one of its aspects, the invention provides an injection molding heated nozzle having a rear end and a forward end with a nose portion having a tapered outer surface extending from a cylindrical portion to the forward end, the nozzle having a melt bore with a first portion which extends centrally from the rear end through the cylindrical portion of the nozzle and a second portion which extends diagonally from the first portion to the tapered surface of the nose portion, the nozzle having an integral electrically insulated heating element with a first end and a second end, the heating element having a longitudinal first portion extending centrally in the nose portion, a second portion extending diagonally to connect the longitudinal first portion to a third helical portion embedded in the cylindrical portion of the nozzle to extend around the first portion of the melt bore, the first end of the heating element extending out from the helical portion to a cold terminal, the improvement wherein the longitudinal portion of the heating element which extends centrally in the nose portion of the nozzle is bent back upon itself at least once to provide at least part of the longitudinal first portion adjacent the second end of the heating element with a multiple thickness which extends along at least a selected portion of the length of the nose portion.

In another of its aspects, the invention provides a method of making an integral elongated injection molding heated nozzle having a rear end and a forward end with a steel cylindrical portion having a generally cylindrical outer surface extending between a steel collar portion adjacent the rear end ad a nose portion having a tapered outer surface adjacent the forward end, the nozzle having a melt bore with a first portion which extends centrally from the rear end through the cylindrical portion of the nozzle and a second portion which extends diagonally from the first portion the tapered surface of the nose portion, the nozzle having an integral electrically insulated heating element with a first end and a second end, the heating element having a longitudinal first portion extending centrally in the nose portion, a second portion extending diagonally to connect the longitudinal first portion to a helical third portion integrally brazed in a spiral channel in the outer surface of the cylindrical portion of the nozzle, the first end of the heating element extending out through an opening in the collar portion to a cold terminal, including the steps of forming an elongated steel tip portion which tapers from a larger diameter rear end to a smaller diameter forward end with a heating element bore extending centrally therethrough from a mouth at the forward end to the rear end, forming an elongated steel main body with a forward end, a rear end, and the melt bore extending therethrough, the main body having the spiral channel in the cylindrical outer surface and a diagonal heating element bore extending from the spiral channel to the forward end of the main body, the forward end of the main body being formed to secure the rear end of the tip portion with the heating element bore in the tip portion connecting with the heating element bore in the main body, mounting the heating element and the tip portion with the longitudinal first portion extending partially through the heating element bore in the tip portion, the second portion extending through the diagonal heating element bore in the main body and the third portion wound in the spiral channel with the first end of the heating element extending from the channel adjacent the rear end of the main body, forming a steel collar portion and mounting it on the rear end of the main body with the rear end of the heating element extending radially out through an opening in the collar portion to the cold terminal, applying a coating of binder and metallic powder to at least the surface of the cylindrical portion, applying brazing material to the joints between the main body and the tip portion and the collar portion, and inserting brazing material into the upright mouth of the heating element bore at the forward end of the tip portion, heating the assembly under a partial vacuum in the presence of an inert gas for a period of time and to a temperature sufficient to melt the metallic powder and remove the binder thereby integrally brazing the helical third portion of the heating element in the channel and providing a protective metallic coating over the surface of the cylindrical portion to melt the brazing material to integrally braze the first and second portions of the heating element in the nozzle and integrally brazing the main body, the tip portion and the collar portion together, and making the integral main body and tip portion to provide the nose portion and the forward end of the nozzle with a predetermined configuration the improvement including the step of bending the heating element back upon itself at least once prior to mounting to provide at least part of the longitudinal first portion adjacent the second end of the heating element with a multiple thickness which extends along at least a selected portion of the length of the nose portion.

Further objects and advantages of the invention will appear from the following description, taken together with the accompanying drawings.

BRIEF DESCRIPTION OF THE DRAWINGS

FIG. 2 is a cross sectional view along line 2—2 in FIG. 1;

FIG. 3 shows the heating element bent back upon itself;

FIG. 4 is a sectional view of a die showing swaging of the bent heating element;

FIG. 5 is a partially exploded view illustrating assembly of the nozzle according to the first embodiment;

FIG. 6 is a schematic view showing the assembled nozzle being sprayed with lacquer;

FIG. 7 is a schematic view illustrating the sprayed nozzle being dipped in nickel powder;

DETAILED DESCRIPTION OF THE DRAWINGS

Figure 1:
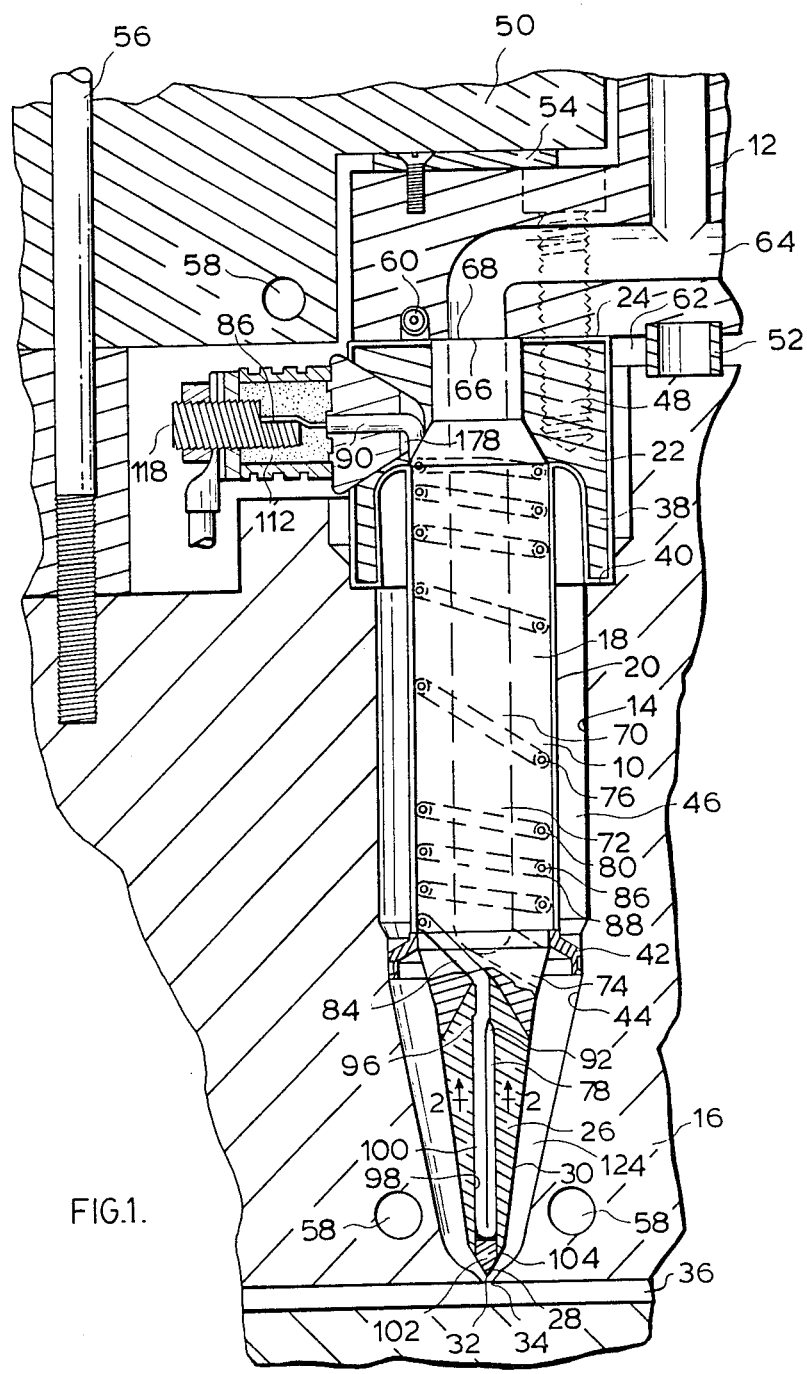
FIG. 1 is a sectional view of a portion of an injection molding system showing a nozzle according to a first embodiment of the invention.
Figure 8:
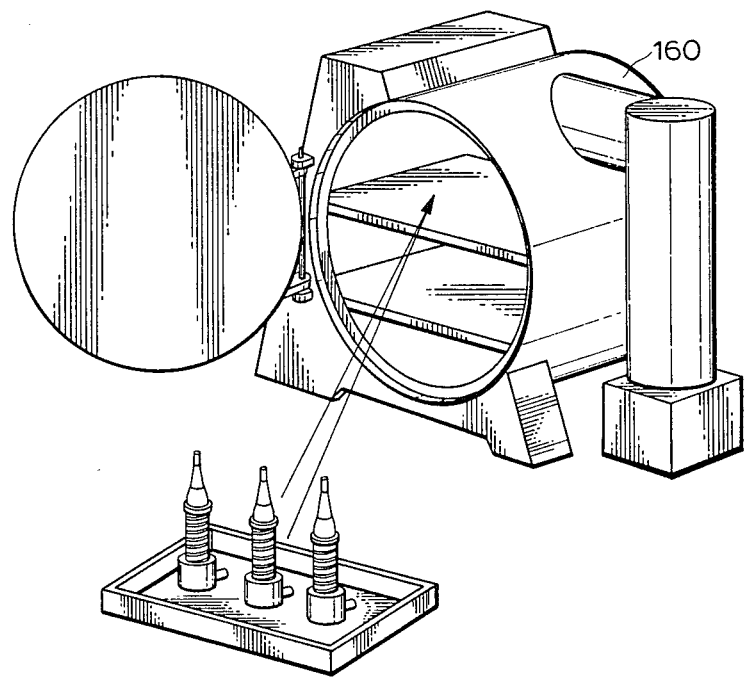
FIG. 8 shows a batch of assembled nozzles to be inserted in a vacuum furnace.

Reference is first made to FIG. 1 which shows a portion of a multi-cavity injection molding system wherein a number of heated nozzles 10 extend from a common elongated heated manifold 12. Each heated nozzle 10 is seated in a well 14 in a cavity plate 16. The nozzle 10 has a steel cylindrical portion 18 with a generally cylindrical outer surface 20 extending between a steel collar portion 22 adjacent the rear end 24 and a steel elongated nose portion 26 adjacent the forward end 28. The nose portion 26 has a tapered outer surface 30 which leads to a pointed tip 32 at the forward end 28 which is in alignment with a gate 34 in the cavity plate 16 leading to a cavity 36.

The nozzle 10 is seated in this position in the well 14 by a circumferential insulation flange or bushing 38 which extends from the collar portion 22 and sits on a circumferential shoulder 40. The nozzle is accurately located with the pointed tip 32 in alignment with the gate 34 by a circumferential sealing and locating flange 42 which extends between the central portion 18 and the nose portion 26 to abut against the inner surface 44 of the well 14. As can be seen, other than the insulation flange 38 and the sealing and locating flange 42, the heated nozzle 10 is separated from the surrounding cooled cavity plate 16 by an insulative air space 46.

Each nozzle 10 is fastened by bolts 48 to the manifold 12 which is secured between the cavity plate 16 and a top clamp plate 50 by a locating ring 52 and a titanium pressure pad 54. The back plate 50 is held in place by bolts 56 which extend into the cavity plate 16. The back plate 50 and the cavity plate 16 are cooled by pumping cooling water through cooling conduits 58. The manifold 12 is heated by an electric heating element 60 which is cast into it as described in the applicant's U.S. Pat. No. 4,688,622 entitled "Injection Molding Manifold Member and Method of Manufacture" which issued Aug. 25, 1987. The locating ring 52 provides another insulative air space 62 between the heated manifold 12 and the cooled cavity plate 16.

The manifold 12 has a melt passage 64 which branches from a common inlet to a number of outlets 66 on the opposite side. Each outlet is in alignment with an inlet 68 to a melt bore 70 extending through one of the nozzles. Each melt bore 70 has a central portion 72 extending from the rear end 24 and a diagonal portion 74, which extends to the tapered surface 30 of the nose portion 26.

The nozzle 10 is heated by an electrically insulated heating element 76 having a longitudinal portion 78 which extends centrally in the nose portion 26, a helical portion 80 wound in a spiral channel 82 in the outer surface 20 of the cylindrical portion 18, and a diagonal portion 84 which extends into the nose portion 26 of the nozzle 10 beneath the circumferential sealing and locating flange 42 to connect the longitudinal portion 78 to the helical portion 80. In this low voltage single wire heating element embodiment, the heating element 76 has a nickel-chrome resistance wire 86 extending centrally through a refractory powder electrical insulating material such as magnesium oxide inside a steel casing 88. The heating element 76 has a first rear end 90 and a second end 92 at which a short length 94 of the resistance wire 86 is exposed by projecting from the insulating material and casing 88. Thus, when the heating element 76 is brazed in nickel as described below, the exposed length 94 grounds the heating element to the nozzle.

The longitudinal portion 78 of the heating element 76 is integral brazed in a heating element bore 96 which extends centrally in the nose portion 26. In this embodiment of the invention, the heating element bore 96 has a larger diameter part 98 extending from the forward end 28. As can be seen in FIG. 3, the longitudinal portion 78 of the heating element 76 is doubled back upon itself to form a double thickness part 100 of the longitudinal portion 78 adjacent the exposed second end 92 of the heating element. This double thickness part 100 of the longitudinal portion 78 of the heating element is mounted in the enlarged part 98 of the heating element bore 96. As described in the applicant's Canadian patent application serial No. 549,517 mentioned above, an air-hard tool steel insert portion 102 is brazed in a mouth 104 of the heating element bore 96 adjacent the bend in the heating element to form the pointed tip 32. Thus, it will be appreciated that the double thickness part 100 of the heating element provides additional heat to the nose portion 26 of the nozzle 10. It will also be appreciated that the length of the enlarged part 98 of the heating element bore 96 and the corresponding length of the double thickness part 100 of the heating element can be selected to provide this additional heat along a desired length of the nose portion 26 back from an air-hard tool steel insert portion 102. The helical portion 80 of the heating element in the spiral channel 82 and the outer surface 20 are covered with a protective nickel coating as described in the applicant's Canadian patent application serial No. 542,185, referred to above.

As seen in FIG. 5, the rear end 90 of the heating element 76 extends out through a central bore 106 in a plug 108 received in the collar portion 22. The resistance wire 86 at the rear end 90 of the heating element 76 connects to a threaded stud 110 surrounded by ceramic insulation 112 inside a cylindrical steel sleeve 114 which is attached to the plug 108. A ceramic washer 116 and a steel washer 117 are received on the projecting stud 110 to form a cold terminal 118 which receives an external power lead 120 which is held securely in place by nut 122. Thus, electrical current from the lead 120 flows through the heating element 76 to the ground at the second end 92. This heats the nozzle 10 throughout both cylindrical portion 18 and the nose portion 26. As mentioned above, the length of the double thickness part 100 of the longitudinal portion 78 of the heating element can be selected to provide the amount of additional heat required to the nose portion 26 and particularly the pointed tip 32 for any particular application. A thermocouple is normally mounted in a thermocouple hole (not shown) which is drilled diagonally into the nose portion 26 to measure the temperature during use.

In use, after the injection molding system has been finished ground assembled as shown in FIG. 1 and described above, electrical power is applied through the lead 120 to the heating element 76 in each nozzle 10 and to the heating element 60 in the manifold 12 to heat the nozzle 10 and the manifold to a predetermined operating temperature. Pressurized melt from a molding machine (not shown) is then introduced into the melt passage 64 in the manifold 12 according to a predetermined cycle in a conventional manner. The pressurized melt flows through the melt bore 70 in each nozzle 10 into a space 124 surrounding the tapered surface 30 of the nose portion 26, and then through the gate 34 and fills the cavity 36. The space 124 remains filled with melt, a portion of which solidifies adjacent the cooled cavity plate 16, and the sealing and locating flange 42 prevents it escaping into the insulative air space 46. After the cavities are filled, injection pressure is held momentarily to pack and then released. After a short cooling period, the mold is opened to eject the molded products. After, ejection, the mold is closed and injection pressure is reapplied to refill the cavity. This cycle is continuously repeated with a frequency dependent on the size and shape of the cavities and the type of material being molded.

Reference will now be made to FIGS. 3 to 8 in describing the steps involved in making the nozzle described above according to a first embodiment of the invention. An elongated main body 126 is cast of a tool steel such as H13 with a cylindrical portion 18 having a cylindrical outer surface 20 extending between a smaller diameter neck portion 128 at the rear end 24 and a tapered portion 130 leading to the recessed forward end 132 of the main body 126. A spiral channel 82 having varying pitches according to a predetermined configuration is cast in the cylindrical outer surface 20 of the central portion 18. As seen in FIG. 5, the central portion 72 of the melt bore 70 is drilled from the rear end 24 to join the diagonal portion 74 which is drilled in the tapered portion 130. A smaller diameter heating element bore 134 is drilled diagonally in the tapered portion 130 to connect to the end 136 of the spiral channel 78.

An elongated tip portion 138 is formed of an air-hard tool steel to have an outer surface 140 which tapers from a larger diameter rear end 142 to a smaller diameter forward end 144. A heating element bore 96 is drilled centrally through the tip portion 138 and machined adjacent the forward end 144 to form a larger diameter mouth 104. As can be seen, in this embodiment, the outer surface 140 is cylindrical around the mouth 104 at the forward end 144 where it is later machined. The rear end 142 of the tip portion 138 has a beveled surface 148 which matches the recessed forward end 132 of the main body 126. Thus, when the tip portion 138 is mounted on the forward end 132 of the main body 126, the heating element bore 96 through the tip portion 138 is accurately aligned with the forward end of the diagonal heating element bore 134 in the main body 126.

A cylindrical collar portion 22, a tapered plug 108 and a sleeve 114 are also made of a suitable tool steel. The collar portion 22 has a central opening 149 therethrough to snugly receive the neck portion 128 of the main body 126. The collar portion 22 is made with a circumferential insulation flange 38 which extends forward and is somewhat larger in diameter than the outer surface 18 to form an insulative air space between them. A tapered surface 150 leading to the central opening 149 matches a tapered surface 152 between the neck portion 128 and the cylindrical outer surface 20 of the central portion 18 of the main body 126. These tapered surfaces 150, 152 accurately locate the collar portion 22 on the neck portion 128 of the main body 126 and they are given a roughened finish to promote capillary action during brazing. The collar portion 22 also has a radial opening 154 extending outwardly therethrough from the central opening 149. The radial opening has a tapered surface 156 to receive the tapered plug 108 which has a central heating element bore 106 extending therethrough in alignment with the sleeve 114. As described in more detail in copending Canadian patent application serial No. 549,520 to Mold-Masters Limited entitled "Method of Manufacture of Injection Molding Nozzle Electric Terminal" filed Oct. 16, 1987, the sleeve 114 has an inner surface 157 which is threaded and broached to receive the ceramic insulating material 112.

As can been seen, in this embodiment the heating element bore 96 through the tip portion 138 is drilled to have the larger diameter part 98 extending from the mouth 104 at the forward end 144. The outer casing 88 and insulating material of the heating element 76 are stripped adjacent the second end 92 to expose approximately 0.3 mm of the resistance wire 86. The heating element 76 is doubled back upon itself to provide the double thickness part 100 adjacent the second end 92. As mentioned above, the lengths of the larger diameter part 98 and the double thickness part 100 of the heating element correspond and are selected to provide additional heat to a desired length of the nose portion 26 of the nozzle 10 depending upon the application it is to be used for. As shown in FIG. 4, the double thickness part 100 of the heating element 76 is swaged in a die 158 to give it the more circular cross-section shown in FIG. 2. The components are then assembled as follows. The first rear end 90 of the heating element is inserted through the mouth 104 into the heating element bore 96 of the tip portion 138 and then through the diagonal heating element bore 134 in the main body 126. The heating element is pulled tight to mount the tip portion 138 on the forward end 132 of the main body 126 and draw the double thickness part 100 of the heating element into the larger diameter part 98 of the heating element bore 96 through the tip portion 138. This provides additional heat to the longitudinal portion 78 of the heating element 76 extending through the central heating element bore 96 in the nose portion 26 and the diagonal portion 84 extending through the diagonal heating element bore 134. As described above, the beveled rear end 142 of the tip portion 138 is accurately located in the recessed forward end 132 of the main body 126 and they are tack welded together to hold the tip portion 138 in place. The forward end 132 of the main body 126 is made sufficiently larger in diameter than the rear end 142 of the tip portion 138 to form an inclined shoulder where they join. A bead of nickel brazing paste is later run along this inclined shoulder, from where it runs down between the rear end 142 of the tip portion 138 and the forward end 132 of the main body 126 when the assembly is brazed in the vacuum furnace 160. The helical portion 80 of the heating element is then wound in the spiral channel 82 with the rear end 90 projecting adjacent the rear end 24 of the main body 126. The plug 108 is then inserted over the projecting rear end 90 of the heating element and located firmly in place in the tapered opening 154. As the heating element 76 fits snugly in the hole 106 through the plug 108, this bends the heating element to a position wherein the rear end 90 of the heating element projects past the surface of the plug 108. This projecting portion is then stripped of the casing 88 and the insulation and welded to a flat surface 162 of the threaded stud 110. The sleeve 114 is then located in place around a locating flange 164 on the plug 108, and the plug 108 and sleeve 114 are tack welded to retain them in this position. Beads of nickel brazing paste are later applied along where the plug 108 joins the collar portion 22 and where the sleeve 114 joins the plug 108.

The circumferential sealing and locating flange 42 is then inserted over the forward end 132 of the main body 126 to a position abutting against a locating shoulder 166. As described in more detail in the applicant's copending Canadian patent application serial No. 549,519 entitled "Injection Molding Nozzle with Resilient Sealing and Locating Flange" filed Oct. 16, 1987, this tool steel flange 42 is slightly resilient to form a tight seal against the inner surface 44 of the well to contain the pressurized melt during use. A bead of brazing material such as nickel paste is applied along where the flange 42 joins the main body 126.

As shown in FIGS. 6 and 7, the assembly is sprayed with a binder such as acrylic lacquer 168 and then immersed in a bath of nickel alloy powder 170 which sticks to the lacquer to coat the surfaces of the central portion 18 and the collar portion 22. Plastic covers 172 are located over the tip portion 138 and sealing and locating flange 42 as well as sleeve 114 to prevent them being coated. The melt bore 70 is also coated by brushing lacquer in and then applying the powder. While the binder 168 is preferably an acrylic lacquer which volatizes when heated in the vacuum furnace 160, other suitable binders may be used. The powder 170 is preferably nickel or an alloy thereof, but other suitable metals which form a conductive and protective coating may be used. The powder 170 is agitated by aeration from the bottom 174 to provide a fluidized bath to ensure the assembly is completed coated. While the preferred method is to apply this coating by successively spraying the assembly with the liquid and then dipping it in the powder, it can be applied in one step by mixing the powder in the liquid before application. After the coating and the beads of brazing paste have been applied, the assembly is oriented with the forward end 28 upright and an airhard tool steel insert portion 102 is inserted into the mouth 104 at the forward end 144 of the tip portion 138. The insert portion 102 drops into the heating element bore 146 and rests against the bend in the heating element 76. A predetermined quantity of nickel alloy powder 176 is inserted into the mouth 104 on top of the tool steel insert portion 102. The insert portion 102 has a square cross section so that it is accurately located in the mouth 104 of the heating element bore 96, but has spaces around it.

The coated assemblies are then loaded in batches into the vacuum furnace 160. As the furnace is gradually heated to a temperature in excess of the melting point of the brazing material, the furnace is evacuated to a relatively high vacuum to remove substantially all the oxygen. When the coating is heated, the binder is volatized, but the nickel alloy remains in place. Before the melting temperature of the nickel alloy is reached, the vacuum is reduced by partially back filling with an inert gas such as argon or nitrogen. When the nickel alloy melts, it flows by capillary action around the roughened surface of the heating element 76 to completely fill the spiral channel 82 and integrally embed the heating element 76. The molten nickel alloy also flows into the space 178 around the neck portion 128 and the brazing paste melts and flows around the plug 108 and the end of the sleeve 106. Similarly brazing material melts and flows around the circumferential flange 42 down between the rear end 142 of the tip portion 138 and the forward end 132 of the main body 126. These surfaces are roughened to promote capillary flow of the nickel alloy between them. The nickel alloy powder 176 in the mouth 104 melts and flows down around the insert portion 102 to completely embed it as well as the longitudinal and diagonal portions 78, 84 of the heating element. Thus, the tip portion 138 and the collar portion 22 are integrally brazed to the main body 126. The heating element 76 is brazed in the spiral channel 82 and the diagonal heating element bore 134 and the central bore 96 through the tip portion 138. Of course, the exposed wire 94 is electrically grounded in the surrounding nickel alloy at the second end 92 of the heating element. The nickel alloy powder on the surfaces of the assembly provides a complete protective coating of nickel alloy having a substantially uniform thickness, including the surfaces of the melt bore 70. Brazing the assembly in a vacuum provides a metallurgical bonding of the nickel alloy to the steel which improves the efficiency of the heat transfer from the heating element 76 as well as the adherence of the protective coating. Thus as integral structure is provided which sufficiently transfers heat from the heating element and distributes it along the melt bore. As can be seen, the pitch or heat profile of the heating element 76 varies along its length to provide less heat in the middle of the nozzle where there is less heat loss. This profile can be controlled for any particular application by varying the pattern of the spiral channel 82 which is cast in the outer surface 20 of the main body 126. Thus, combined with the provision of a selected length of the double thickness part 100 of the longitudinal portion 78 of the heating element in the nose portion 26, the temperature of the melt can be controlled accurately throughout its flow through the system.

After the nozzles 10 are cooled and removed from the vacuum furnace 160, they are machined to form the tapered outer surface 30 of the nose portion 26 and the pointed tip 32. As may be seen, the pointed tip 32 is formed of air-hard tool steel which is both corrosion and wear resistant which increases the operating life of the nozzle. The ceramic insulating material 112 is then poured into the sleeve 114 around the threaded stud 110. After the ceramic material has hardened, the ceramic washer 116 and steel washer 117 are located on the projecting stud 110 and the nut 122 attaches the electrical lead 120 during use.

Figure 9:
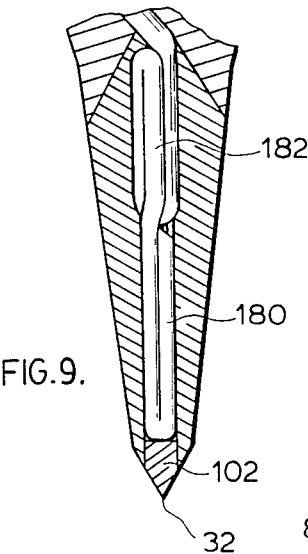
FIG. 9 is a sectional view of the nose portion of a nozzle according to a second embodiment of the invention.
Figure 10:
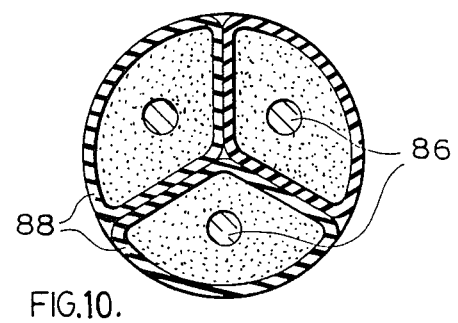
FIG. 10 is a cross sectional view along line 10—10 in FIG. 9.
Figure 11:
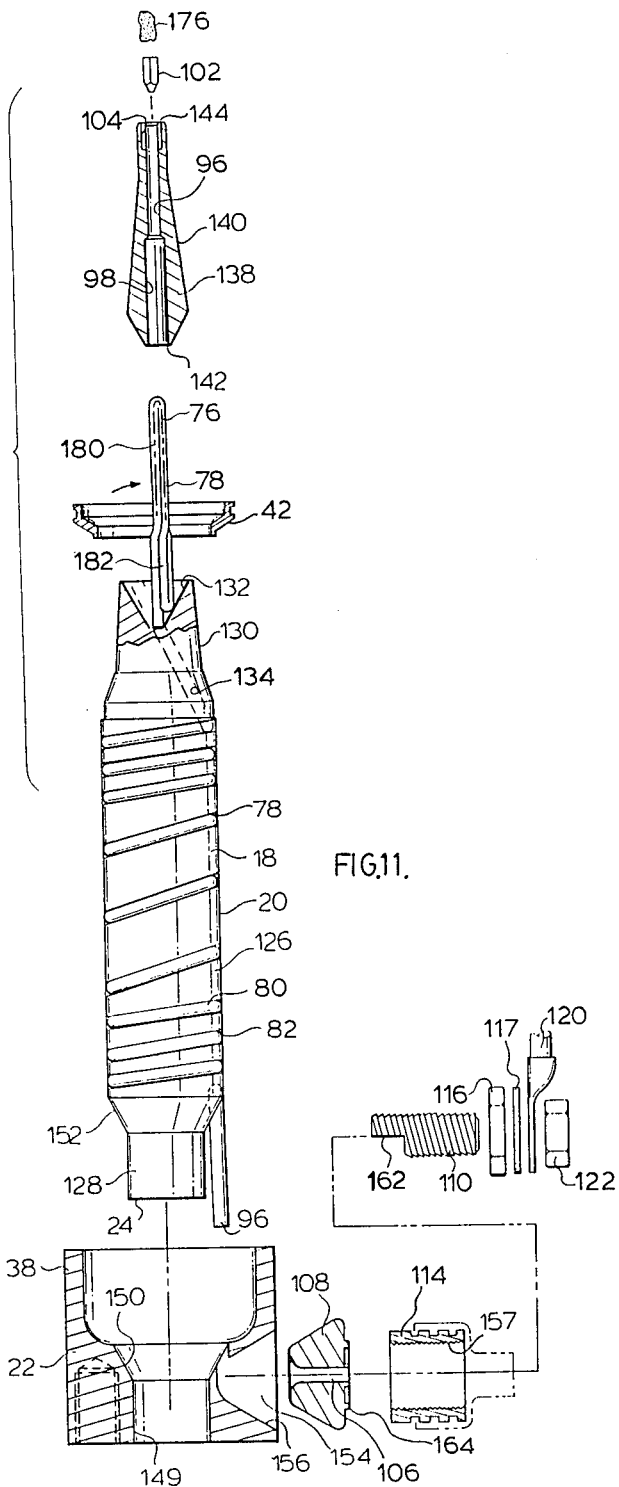
FIG. 11 is a partially exploded view illustrating assembly of the nozzle according to the second embodiment of the invention.

Reference is now made to FIGS. 9, 10 and 11 which illustrate a nozzle according to a second embodiment of the invention and a method of making it. As most of the elements of the second embodiment are identical to those of the first embodiment, elements common to both embodiments are described and illustrated using the same reference numerals. In this second embodiment, the heating element bore 96 is drilled through the tip portion 138 with the larger diameter portion 98 extending from the rear end 142 rather than the forward end 144. The heating element bent back upon itself twice to provide the 76 is bent back upon itself to provide the longitudinal portion 78 with a double thickness part 180 and a triple thickness part 182. As clearly shown in FIG. 9, the double thickness part 180 extends between the triple thickness part 182 and an air-hard tool steel insert portion 102 which forms the point tip 32. Of course, the lengths of the double and triple thickness parts 180, 182 of the heating element are selected to provide a desired heat profile in the nose portion 26 of the nozzle depending upon the application. Otherwise, the description of the second embodiment is the same as that given above for the first embodiment and need not be repeated.

The method of making the second embodiment is somewhat different from that described above. After the heating element is bent, both the double and triple thickness parts 180, 182 are swaged in the die 158 to give them more circular cross-sections as shown in FIGS. 2 and 10. The heating element 76 is then inserted through the diagonal heating element bore 134 through the main body 126 leaving the longitudinal portion 78 projecting a predetermined distance from the forward end 132 of the main body depending on the length of the tip portion 138. The helical portion 80 is wound in the spiral channel 82 leaving the rear end 90 projecting adjacent the rear end of the main body 126. The tip portion is mounted in place over the projecting longitudinal portion 78 of the heating element with the beveled rear end 142 being received in the recessed forward end 132 of the main body 126 as described above. This bends the heating element and locates the triple thickness part 182 in the larger diameter portion 98 of the heating element bore 96 with the double thickness part 180 extending to the mouth 104. The remainder of the method and the use are the same as described above and need not be repeated.

While the description of the nozzle and the method of making it have been given with respect to preferred embodiments, it is not to be construed in a limiting sense. Variations and modifications will occur to those skilled in the art. For instance, the heating element can be of the double wire type for higher voltages, in which case it would not be grounded at the second end. Alternatively the exposed resistance wire 86 at the forward end of the heating element can be brazed in nickel alloy to form a pointed tip 32 without the use of an air-hard tool steel insert portion 102. This also provides the nozzle with a pointed tip which is corrosion and wear resistant and can be heated to a predetermined temperature as described above. The tip portion 138 can have a different shape and the forward end 28 of the nozzle can be machined to have a different shape to provide a nozzle suitable for edge gating, as described in Canadian patent application serial No. 549,518 to Mold-Masters Limited entitled "Injection Molding Nozzle having Grounded Heating Element Brazed into Pointed Tip" filed Oct. 16, 1987. Reference is made to the appended claims for a definition of the invention.

What I claim is:

1. In an elongated integral injection molding heated nozzle having a rear end and a forward end with a nose portion having a tapered outer surface extending from a cylindrical portion to the forward end, the nozzle having a sealing and locating flange projecting outwardly between the cylindrical portion and the nose portion and a melt bore with a first portion which extends centrally from the rear end through the cylindrical portion of the nozzle and a second portion which extends diagonally from the first portion to the tapered surface of the nose portion, the nozzle having an integral electricity insulated heating element with a first end and a second end, the heating element having a longitudinal first portion extending centrally in the nose portion, a second portion extending diagonally to connect the longitudinal first portion to a third helical portion embedded in the cylindrical portion of the nozzle to extend around the first portion of the melt bore, the first end of the heating element extending out from the helical portion to a cold terminal, the improvement wherein:

the longitudinal first portion of the heating element which extends centrally in the tapered nose portion of the nozzle is bent back upon itself to provide the longitudinal first portion with a rearward triple thickness part and a forward double thickness part which extends forward from the triple thickness part to adjacent the forward end of the nozzle.

2. An injection molding nozzle as claimed in claim 1 wherein the nozzle has a collar portion adjacent the rear end wherethrough the first end of the first end of the heating element extends radially outward to the cold terminal.

3. An injection molding nozzle as claimed in claim 2 wherein the longitudinal portion of the heating element which extends centrally in the nose portion stops short of the forward end of the nozzle, the forward end of the nozzle being formed by a corrosion and wear resistant portion extending in alignment with the longitudinal portion of the heating element.

4. An injection molding nozzle as claimed in claim 3 wherein the heating element has a resistance wire extending centrally through an electrical insulating material in an outer casing, the resistance wire being grounded at the second end of the heating element.

5. An injection molding nozzle as claimed in in claim 3 wherein the heating element has a double resistance wire extending centrally through an electrical insulating material in an outer casing.

* * * * *